(12) United States Patent
Abe et al.

(10) Patent No.: US 6,248,461 B1
(45) Date of Patent: Jun. 19, 2001

(54) ELECTRIC POWER GENERATING SYSTEM

(75) Inventors: Masayuki Abe; Hiroshi Matsuo, both of Kyoto (JP)

(73) Assignee: Kansai Research Institute (JP)

( * ) Notice: Subject to any disclaimer, the term of this patent is extended or adjusted under 35 U.S.C. 154(b) by 0 days.

(21) Appl. No.: 09/342,951

(22) Filed: Jun. 29, 1999

(30) Foreign Application Priority Data

Mar. 10, 1999 (JP) ................................. 11-063219

(51) Int. Cl.$^7$ ...................................................... H01M 8/04
(52) U.S. Cl. ............................................... 429/22; 429/26
(58) Field of Search ............................... 429/22, 23, 24, 429/26

(56) References Cited

U.S. PATENT DOCUMENTS

| 5,334,463 | * | 8/1994 | Tajima et al. | 429/23 X |
| 5,519,312 | * | 5/1996 | Wang et al. | 429/23 X |
| 5,612,615 | * | 3/1997 | Gold et al. | 323/360 |
| 5,637,414 | * | 6/1997 | Inoue et al. | 429/22 X |
| 5,796,238 | * | 8/1998 | Hiratsuka et al. | 429/22 X |

FOREIGN PATENT DOCUMENTS

| 03106217 | 5/1991 | (JP) . |
| 10256529 | 9/1998 | (JP) . |

OTHER PUBLICATIONS

Office Action (dated Jan. 13, 2000) from corresponding Japanese Patent Application No. 11–63219, filed Mar. 10, 1999, including English language translation.

* cited by examiner

Primary Examiner—Stephen Kalafut
(74) Attorney, Agent, or Firm—Webb Ziesenheim Logsdon Orkin & Hanson, P.C.

(57) ABSTRACT

An electric power generating system includes a cell such as a fuel cell for outputting direct-current power and a conversion device having at least either one of an inverter for converting the direct current power into alternating-current power and a converter for changing a voltage level of the direct-current power. The cell generates high-temperature thermal energy of 60° C. or higher in association with the generation of direct-current power. The conversion device employs a semiconductor element capable of operating at an ambient temperature of 55° C. or higher. The semiconductor element may be an element having a wider band gap than Si. Further, the conversion device may employ a GaAs semiconductor element, an InP semiconductor element, an SiC semiconductor element, a GaN semiconductor element or combinations thereof.

9 Claims, 3 Drawing Sheets

ELECTRIC POWER GENERATING SYSTEM

BACKGROUND OF INVENTION

1. Field of the Invention

The present invention relates to an electric power generating system including a cell such as a fuel cell for outputting direct current power, and a conversion device having at least either an inverter for converting the direct-current power into alternating-current power or a converter for changing a voltage level of the direct-current power. More particularly, the invention relates to the art of improving energy efficiency of such electric power generating system.

2. Description of the Related Art

As such electric power generating system noted above, there is known a fuel cell electric generating system including a reformer for obtaining hydrogen from raw fuel material such as natural gas, a fuel cell for generating direct-current power through a reversed electrolysis of water between the hydrogen obtained by the reformer and oxygen obtained from air, with exhaust of high-temperature heat, and an exhaust heat recovery equipment for recovering thermal energy of the heat generated from the fuel cell.

Such fuel cell electric power generating system is an environmentally friendly electric power generating system due to its zero SOx emission, extremely low NOx emission, low $CO_2$ emission, low generation of noises and vibrations. The system provides the further advantage of effective energy utilization of about 40% electric power generating efficiency, and about 85% total energy efficiency combining the electric power generating efficiency and the heat recovery efficiency. For these reasons, interest in the fuel cell electric power generating system as a new promising energy source has been ever increasing in recent years.

The inverter mentioned above generally comprises an electric circuit using diodes, transistors or the like which are formed of silicon semiconductor. Hence, the upper limit of the operating temperature of the inverter is determined by the upper limit of the operating temperature of the silicon semiconductor. The ambient temperature for rated operation of silicon semiconductor is generally 25° C. And, the upper limit of the ambient temperature of the silicon semiconductor for general consumer use is 55° C.

Incidentally, the fuel cell generates high-temperature exhaust heat in association with the chemical reaction for the electric power generation. Then, for effective utilization of this heat, the exhaust-heat recovery equipment is provided, as described above, for recovering the heat energy in the form of hot water or vapor. On the other hand, the operating temperature of the fuel cell is 60° C. to 120° C. if it is the solid high molecular type, 170° C. to 220° C. if it is the phosphoric acid type, 650° C. if it is the molten carbon salt type, and even 1000° C. if it is the solid electrolyte type, so that the fuel cell generates such high-temperature heat.

However, as the exhaust heat from the fuel cell normally has the temperature higher than 60° C., the inverter cannot operate normally at such high temperature, hence leading to malfunction of the entire system. For enabling the inverter to operate at least at an ambient temperature below 60° C., the prior art has proposed to shield the inverter from the high temperature or cool it and also to provide means for reducing the high-temperature thermal energy within the exhaust-heat recovery equipment. Such cooling is believed to be responsible for about 5% reduction in the total energy efficiency.

The present invention has been made in order to solve the above-described shortcoming of the convention. A primary object of the invention is to provide improvement in the energy efficiency of such electric power generating system.

SUMMARY OF THE INVENTION

For accomplishing the above-noted object, according to one aspect of the present invention, an electric power generating system comprises a cell for outputting direct-current power, and a conversion device having at least either an inverter for converting the direct-current power into alternating-current power or a converter for changing a voltage level of the direct-current power, wherein the cell generates high-temperature thermal energy of 60° C. or higher in association with the generation of the direct-current power, and the conversion device comprises an element capable of operating at an ambient temperature of 55° C. or higher.

With the above feature, the conversion device can operate at a high ambient temperature of 55° C. or higher. Hence, the high-temperature thermal energy of 60° C. or higher may be utilized with higher efficiency, without being cooled unnecessarily. Consequently, the total energy efficiency combining the electric power generating efficiency and the heat recovery efficiency may be improved. Further, as the insulation and/or cooling of the conversion device may be simplified or even eliminated, it becomes possible to dispose this conversion device in the vicinity of the cell or the exhaust-heat recovery equipment. As a result, greater integration and compactness of the entire generating system may be achieved also.

According to a further aspect of the present invention, an electric power generating system comprises a cell for outputting direct-current power, and a conversion device having at least either an inverter for converting the direct-current power into alternating rent power or a converter for changing a voltage level of the direct-current power, wherein the conversion device comprises a semiconductor having a wider band gap than Si.

With above construction, the wider the band gap the semiconductor element has, the higher the temperature the element can operate, as will be detailed later. Therefore, the upper limit of the operating temperature of the semiconductor element which determines the operating temperature of the conversion device may be extended in comparison with the conventional conversion device using Si semiconductor. Consequently, in this case too, the high-temperature thermal energy of 60° C. or higher may be utilized with higher efficiency, without being cooled unnecessarily. And, the total energy efficiency combining the electric power generating efficiency and the heat recovery efficiency may be improved accordingly.

In addition to the above-described feature, preferably, the conversion device comprises a GaAs semiconductor element, an InP semiconductor element, an SiC semiconductor element, a GaN semiconductor element, or any combinations thereof. The GaAs semiconductor element, InP semiconductor element, SiC semiconductor element, and GaN semiconductor element are all capable of operating at an ambient temperature of 55° C. or higher. Then, the conversion device using such element is capable of operating at a high temperature of 60° C. or higher. So that, the total energy efficiency of the entire system may be improved Explanation in qualitative terms will be given next on the operability of the GaAs semiconductor element, the InP semiconductor element, the SiC semiconductor element, or the GaN semiconductor element at a high temperature of 55° C. or higher.

A semiconductor has an energy-band structure consisting of a conduction band and a valence band which are separated from each other. And, the semiconductor exhibits its semiconducting property according to a value Eg of its band gap between the conduction band and the valence band, thus functioning as a diode or a transistor. However, the band gap Eg of most of semiconductors becomes narrower with rise in the temperature. And, this temperature variation can be approximated by the following mathematical expression (I), where t is a temperature and a is a coefficient of the temperature variation.

$$dEg/dt = -a \times 10^{-4} (eV/K) \qquad (I)$$

Accordingly, with rise in the temperature, the band gap Eg becomes smaller, i.e. narrower. Also, with application of significant thermal energy thereto, thermal excitation of free electrons from the valence band to the conduction band will readily occur. As the result, the semiconductor loses its semiconducting property, thus being disabled to function normally as a diode or a transistor. On the other hand, by using a GaAs semiconductor element, an InP semiconductor element, an SiC semiconductor element, or a GaN semiconductor element as the semiconductor, the diode or transistor formed of such semiconductor element can function satisfactorily since the semiconductor element used therein retains a sufficiently wide band gap at a high temperature of 55° C. or higher.

In addition to the above-described features, preferably, the electric power generating system further comprises a controller for controlling operation of at least either one of the cell and the conversion device, the controller having a GaAs semiconductor element, an InP semiconductor element, an SiC semiconductor element, a GaN semiconductor element or combinations thereof. In this case, as the controller is capable of operating at the high temperature of 55° C. or higher, the total energy efficiency may be improved also for the electric power generating system including such controller for controlling input/output of the cell and the conversion device.

Further, the electric power generating system relating to the present invention may be embodied also as a fuel-cell electric power generating system in which the cell comprises a fuel cell. In this case too, the total energy efficiency of the system may be improved.

Further and other features and merits of the invention will become apparent from the following disclosure of preferred embodiments thereof with reference to the accompanying drawings.

DETAILED DESCRIPTION OF THE PREFERRED EMBODIMENTS

Next, preferred embodiments of the present invention will be described in details with reference to the accompanying drawings.

Figure 1:
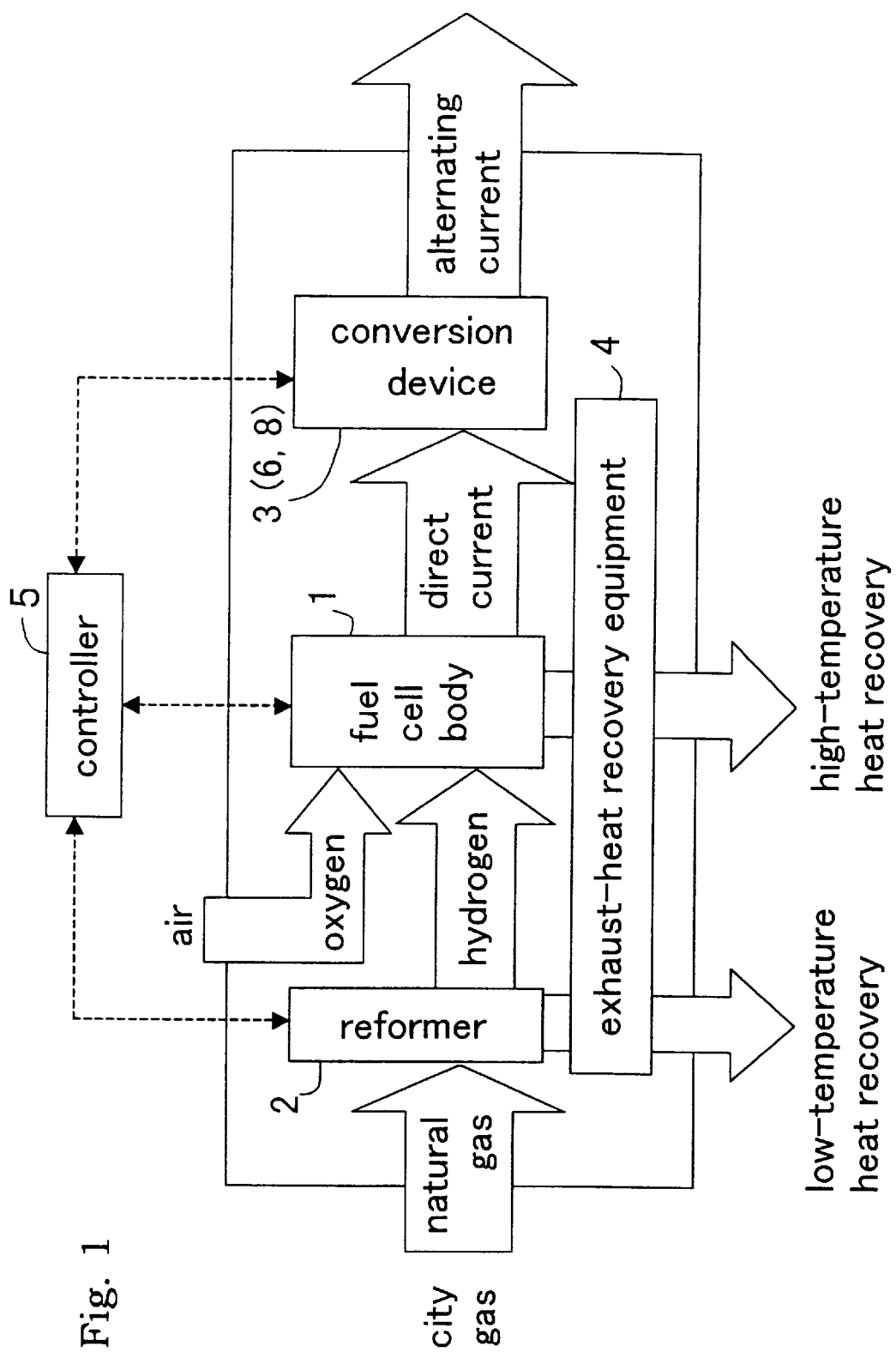
FIG. 1 is a system construction view of an electric power generating system according to one preferred embodiment of the present invention.

FIG. 1 shows an electric power generating system according to one preferred embodiment of the present invention. As shown, this system includes a fuel cell body 1 of phosphoric acid type for receiving supplies of hydrogen and oxygen and outputting direct-current power, a reformer 2 for obtaining the hydrogen from e.g. city gas to be supplied to the fuel cell body 1, a conversion device 3 for converting the direct-current power output from the fuel cell body 1 into alternating-current power, an exhaust-gas recovery equipment for recovering exhaust heat from both the reformer 2 and the fuel cell body 1 in the form of vapor or hot water, and a controller 5 for controlling the operations of the fuel cell body 1, the reformer 2 and the conversion device 3. Hence, the general construction of this system is substantially identical to that of a typical phosphoric acid type fuel cell system.

Figure 2:
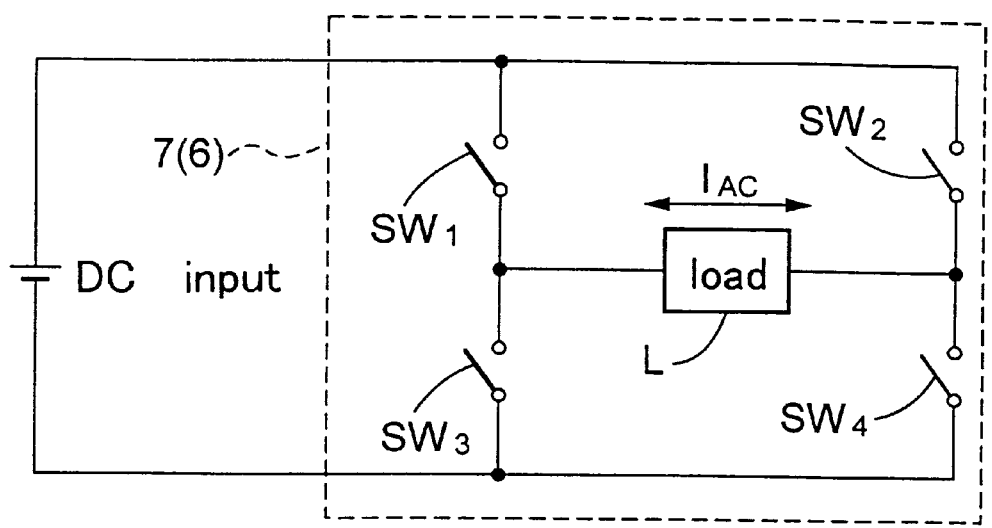
FIG. 2 is a circuit diagram for illustrating a concept of a basic circuit construction of a main circuit of a PWM inverter employed in the electric power generating system according to the embodiment.

The conversion device 3 comprises e.g. a PWM (pulse-width modulation) inverter 6 which outputs a sinusoidal alternating-current power of 100 V to 200 V. FIG. 2 shows a basic construction of a main circuit 7 of this PWM inverter 6. As shown, the main circuit 7 includes four switching elements $SW_1$, $SW_2$, $SW_3$, $SW_4$, the circuit providing the positive half cycle when the elements $SW_1$, $SW_4$ are ON and the elements $SW_2$, $SW_3$ are OFF and providing the negative half cycle when the elements $SW_1$, $SW_4$ are OFF and elements $SW_2$, $SW_3$ are ON, thereby to provide an alternating-current power $I_{AC}$ for a load L.

Figure 3:
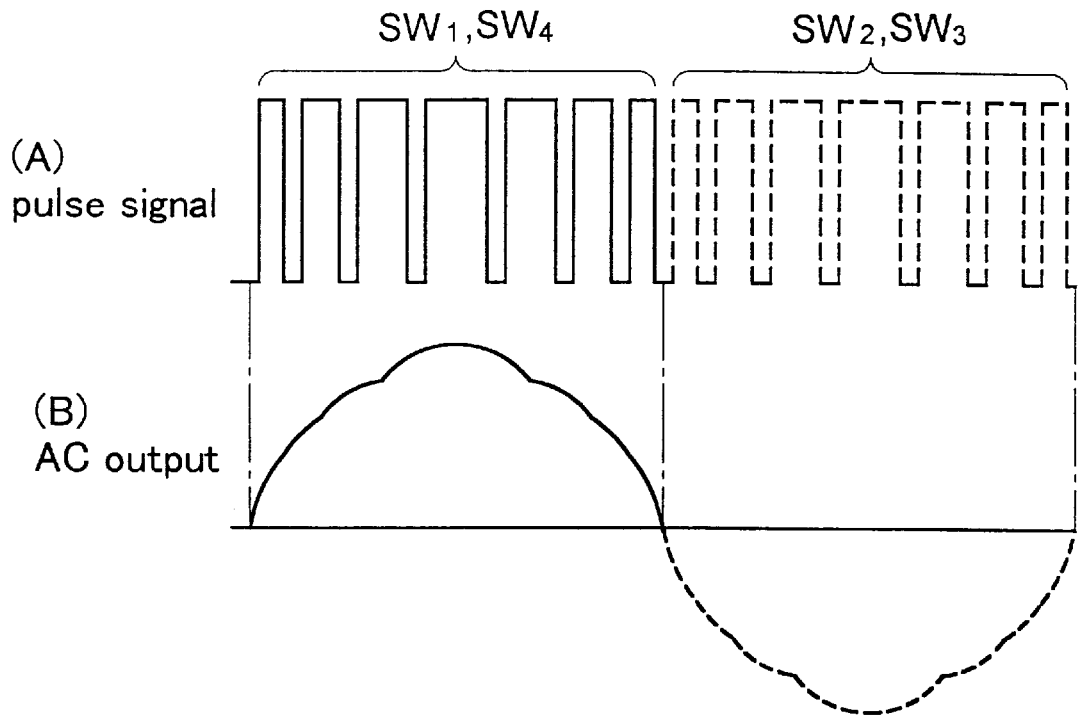
FIG. 3 is a waveform diagram which schematically shows a control signal waveform and an alternating-current output waveform of the PWM inverter.

The ON/OFF control signal impinged on the respective switching elements $SW_1$, $SW_2$, $SW_3$, $SW_4$ is a pulse-width modulated pulsate signal as shown in FIG. 3, so that the amount of electricity is controlled as a function of the pulse width. The alternating-current output is then processed through a low-pass filter into a sinusoidal output waveform as shown in FIG. 3.

Referring to the switching frequency of the control signal, the higher the frequency, the smoother the sinusoidal waveform may be obtained, but at the cost of increased switching loss. This is because a through current runs through the switching elements at the moment all of these four switching elements $SW_1$, $SW_2$, $SW_3$, $SW_4$ are turned ON. The prior art has attempted to reduce such switching loss by shifting the phase of the voltage and that of the current relative to each other. This, however, results in increased loss in the resonant reactor. Accordingly, as an essential solution to this problem, increase in the switching speed of the four switching elements $SW_1$, $SW_2$, $SW_3$, $SW_4$ is required.

Then, in the present embodiment, the four switching elements $SW_1$, $SW_2$, $SW_3$, $SW_4$ comprise MOSFETs (metal oxide semiconductor field effect transistors) which are made of SiC semiconductor having a band gap of 2.3 eV which gap is about 2.5 times wider than that of Si semiconductor.

The SiC-MOSFET described above has a theoretical on-resistance which is two-digits smaller than an Si-MOSFET. Or, the on-resistance of the former is still about one-quarter of that of the latter, even when taking into account the poor degree of crystallization possible with the present state of the art of manufacture. In addition, the SiC-MOSFET has higher withstand voltage than an Si-MOSFET, so that its channel length may be short while securing the necessary withstand voltage. Then, with such shorter channel length in combination with the lower on-resistance, the switching speed may be increased. Consequently, by using the SiC-MOSFET, the switching loss at the main circuit of the inverter may be reduced and the conversion efficiency of the conversion device 3 may be improved accordingly. In the case of this construction, the above-described control signal is input to the gate of the SiC-MOSFET.

Incidentally, since high-temperature exhaust heat of 60° C. or higher is generated from the fuel cell body 1, in the case of the conventional inverter using Si semiconductor, special cooling or heat-insulating measure would have to be taken in order to provide an operating temperature of 55° C. or lower. In contrast, since the upper limit of the ambience temperature of the SiC-MOSFET for its rated operation is as high as 300° C., such special cooling or heat-insulating measure is no longer needed. In this case, peripheral circuits such as the control circuit for generating the control signal too will be formed of SiC semiconductor. With this, the entire conversion device 3 may be operated at a high temperature above 55° C., so that the exhaust-heat recovery factor of the exhaust-heat recovery equipment 4 may be improved and consequently the total energy efficiency of the entire electric power generating system may be improved accordingly. In addition, as the heat discharge and cooling of the SiC-MOSFET per se may be coped with by using smaller components, the above construction allows the whole conversion device 3 to be formed compact as well.

As described above, the essential feature of the present invention lies in the use of SiC semiconductor MOSFET having a wide band gap as the semiconductor element employed in the conversion device 3. Therefore, the other components such as the fuel cell body 1, the reformer 2, the exhaust-heat recovery equipment 4 and so on may be appropriately selected, at the time of embodiment thereof For instance, the fuel cell body 1 is not limited to the phosphoric acid type described in the foregoing embodiment, but may be any other type, such as the solid high molecular type, the molten carbon salt type, and the solid electrolyte type.

Next, an electric power generating system according to a further embodiment of the invention will be described.

In the foregoing embodiment, SiC-MOSFET is employed for each of the four switching elements $SW_1$, $SW_2$, $SW_3$, $SW_4$. Instead of SiC-MOSFET, the switching elements may be formed alternatively of IGBTs (insulated-gate bipolar transistors) of SiC semiconductor, or SiC-MOSFETs and SiC-IGBTs connected in parallel with each other, and so on. Further, as a wide band gap semiconductor element, a GaN type semiconductor element, instead of the SiC semiconductor, may be employed also.

In case the controller 5 is to be exposed to the same high-temperature environment as the fuel cell body 1 inside the housing of the electric power generating system, by using the SiC semiconductor or GaN type semiconductor for the controller 5 as well as for the conversion device 3, the system will be able to effectively endure the high-temperature environment. And, at the same time the system may be formed compact.

Figure 4:
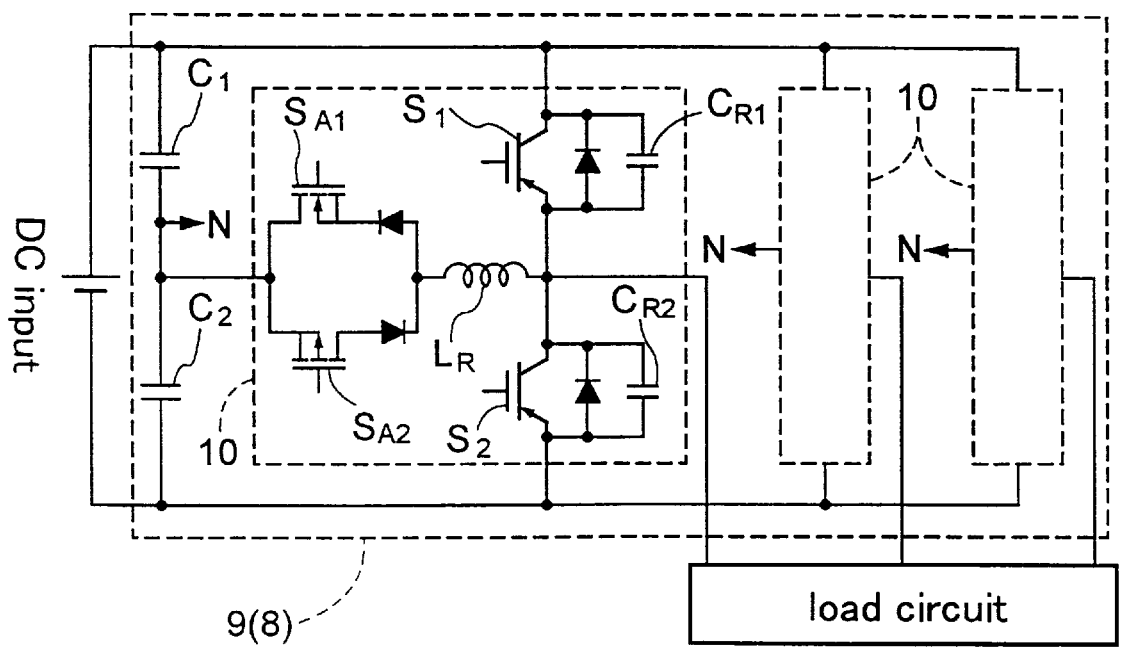
FIG. 4 is a circuit diagram showing a switching circuit unit included in a main circuit of ARCP type PWM inverter employed in an electric power generating system according to a further embodiment of the invention.

According to another embodiment of the conversion device 3, this device comprises an ARCP type (auxiliary resonant commutation pole) PWM inverter 8 which outputs a three-phase sinusoidal alternating-current power at 200 V. FIG. 4 shows the construction of a main circuit 9 of this ARCP type PWM inverter 8. As shown, the circuit comprises a plurality of parallel connected switching circuit units 10 having an auxiliary resonance circuit for each phase. In this construction, main switches $S_1$, $S_2$ are SiC-IGBTs each comprising return diodes anti-parallel connected with each other, whereas auxiliary switches $S_{A1}$, $S_{A2}$ comprise SiC-MOSFETs each comprising rectifying diodes anti-parallel connected with each other. Hence, all these switches are capable of operating under a high temperature environment of 55° C. or higher.

Incidentally, in FIG. 4, a mark $L_R$ denotes a resonant reactor and $C_{R1}$, $C_{R2}$ denote resonant capacitors, and $C_1$, $C_2$ are DC capacitors which divide DC input voltage. The ARCP type PWM inverter 8 functions in the same way as the conventional inverter comprised of Si semiconductor elements and therefore will not be described here.

The inverters to be employed in the conversion device 3 may be any other type of inverter than the PWM inverters 6, 8 described hereinbefore.

The foregoing embodiment relates to an electric power generating system for generating alternating-current power which was converted by the inverters 6, 8 as the conversion device 3 from the direct-current power generated from the fuel cell body 1. Alternatively, the invention may be embodied as a further electric power generating system which uses converters, instead of the inverters 6, 8, for converting the voltage level of DC input/output and outputting the resultant predetermined direct-current power. In this case, the semiconductor elements to be employed in the converter should be the SiC semiconductor elements or GaN type semiconductor elements described hereinbefore.

Further, the conversion device 3 may include both the inverters 6, 8 and the converters so as to output both direct-current power and alternating-current power.

As the cell for generating high-temperature energy of 60° C. or higher in association with output of direct-current power, the foregoing embodiment employs a fuel cell having the fuel cell body 1 and the reformer 2. Alternatively, the present invention may be embodied also as a system which employs any other cell than the fuel cell for generating direct-current power. In the case of such system too, as the conversion device 3 is capable of operating under a high temperature of 55° C. or higher, improvement in the exhaust heat energy recovery factor may be expected.

The present invention may be embodied in many other ways obvious for those skilled in the art than those described in the embodiments disclosed without departing from the essential spirit thereof. Hence, the scope of the invention is not to be limited to the particular constructions disclosed in the embodiments, but should be limited only by the appended claims.

What is claimed is:

1. An electric power generating system comprising:
   a cell for outputting direct-current power and generating high-temperature thermal energy of 60° C. or higher; and
   a conversion device comprised of an element capable of operating at an ambient temperature of 55° C. or higher, wherein in operating said system, the device is exposed to ambient temperatures of 55° C. or higher;
   wherein said conversion device includes at least either one of an inverter for converting the direct-current power into an alternating-current power and a converter for changing a voltage level of the direct-current power.

2. An electric power generating system comprising:
   a fuel cell for outputting direct-current power and generating high-temperature thermal energy of 60° C. or higher; and
   a conversion device comprised of an element capable of operating at an ambient temperature of 55° C. or higher, wherein in operating said system, the device is exposed to ambient temperatures of 55° C. or higher;
   wherein said conversion device includes at least either one of an inverter for converting the direct-current power into alternating-current power and a converter for changing a voltage level of the direct-current power.

3. The electric power generating system as defined in claim 2, wherein the conversion device includes at least one of a GaAs semiconductor element, an InP semiconductor element, an SiC semiconductor element, and a GaN semiconductor element.

4. The electric power generating system as defined in claim 2, further comprising: a controller for controlling operation of at least either one of the cell and the conversion device; wherein said controller includes an element capable of operating at the ambient temperature of 55° C. or higher, wherein in operating the element, the element is exposed to ambient temperatures of 55° C. or higher.

5. The electric power generating system as defined in claim 4, wherein said conversion device and said controller each include at least one of a GaAs semiconductor element, an InP semiconductor element, an SiC semiconductor element, and a GaN semiconductor element.

6. An electric power generating system comprising:
   a cell for outputting direct-current power; and
   a conversion device comprising a semiconductor having a wider band gap than Si, said conversion device capable of operating in and, when operated exposed to, ambient temperatures of 55° C. or higher;
   wherein said conversion device includes at least either one of an inverter for converting the direct-current power into alternating-current power and a converter for changing a voltage level of the direct-current power.

7. The electric power generating system as defined in claim 6, wherein the conversion device includes at least one of a GaAs semiconductor element, an InP semiconductor element, an SiC semiconductor element, and a GaN semiconductor element.

8. (Amended) The electric power generating system as defined in claim 7, further comprising: a controller including at least one of a GaAs semiconductor element, an InP semiconductor element, an SiC semiconductor element, and a GaN semiconductor element; wherein said controller controls operation of at least either one of the cell and the conversion device.

9. The electric power generating system as defined in claim 6, wherein said cell comprises a fuel cell.

* * * * *

UNITED STATES PATENT AND TRADEMARK OFFICE
CERTIFICATE OF CORRECTION

PATENT NO. : 6,248,461 B1
DATED : June 19, 2001
INVENTOR(S) : Masayuki Abe et al.

Page 1 of 1

It is certified that error appears in the above-identified patent and that said Letters Patent is hereby corrected as shown below:

Column 2,
Line 34, "alternating rent" should read -- alternating-current --.
Line 62, after "improved" insert period (.).

Column 8, claim 8,
Line 11, after "8." delete "(Amended).

Signed and Sealed this

Twenty-fifth Day of December, 2001

Attest:

Attesting Officer

JAMES E. ROGAN
Director of the United States Patent and Trademark Office